(No Model.)

W. JOHNSTON.
PLANT PROTECTOR.

No. 326,872. Patented Sept. 22, 1885.

WITNESSES:
Fred. G. Dieterich.
Wm. H. Bagger

William Johnston,
INVENTOR.
by Louis Bagger & Co.
ATTORNEYS.

UNITED STATES PATENT OFFICE.

WILLIAM JOHNSTON, OF DAMARISCOTTA, MAINE.

PLANT-PROTECTOR.

SPECIFICATION forming part of Letters Patent No. 326,872, dated September 22, 1885.

Application filed September 2, 1884. (No model.)

*To all whom it may concern:*

Be it known that I, WILLIAM JOHNSTON, a citizen of the United States, and a resident of Damariscotta, in the county of Lincoln and State of Maine, have invented certain new and useful Improvements in Plant-Protectors; and I do hereby declare that the following is a full, clear, and exact description of the invention, which will enable others skilled in the art to which it appertains to make and use the same, reference being had to the accompanying drawings, which form a part of this specification, and in which—

Figure 1:
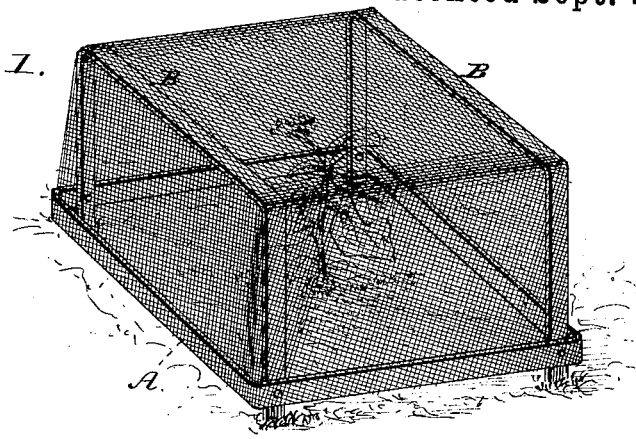
Figure 2:
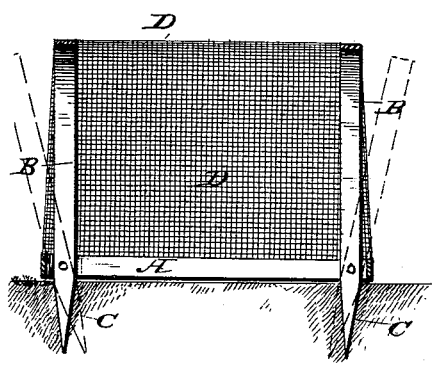
Figure 3:
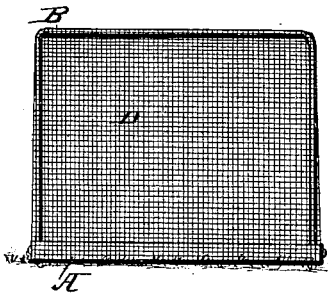
Figure 4:
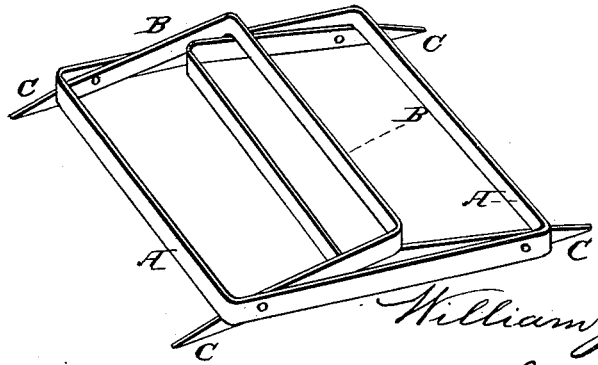

Figure 1 is perspective view of my improved plant-protector, showing the same in position for operation. Fig. 2 is a longitudinal vertical sectional view of the same. Fig. 3 is an end elevation of the protector extended and ready to be applied or placed in position for operation; and Fig. 4 is a perspective view of the protector folded for storage or transportation.

The same letters refer to the same parts in all the figures.

This invention relates to an improved device for protecting growing plants from the ravages of birds or insects, and other causes of destruction or deterioration; and it has for its object to produce a device of this character which shall possess superior advantages in point of simplicity, durability, and general efficiency; which may be easily applied or removed, as circumstances shall require; which shall be inexpensive and easily manufactured; which shall not to the smallest extent exclude air and moisture and thereby interfere with the thriving of the plant, and which may be easily folded into a trifling space, so as to be easily packed or stored for transportation or while not in use.

With these ends in view my invention consists in the improved construction and arrangement of parts, which will be hereinafter fully described, and particularly pointed out in the claim.

In the drawings hereto annexed, A designates a rectangular frame, which may be easily framed, bent, or formed from strips or splints of sheet metal, wood, or other light and inexpensive material. B B designates a pair of bows or bails, bent or formed from similar material, and having their lower ends sharpened so as to form points C C of such a nature that they will readily enter the ground when the device is placed in position. These bows are connected pivotally in any suitable manner to the frame A, at or near the ends of the same, in such a manner that they may be readily folded to the horizontal position shown in Fig. 4 of the drawings, or extended, as shown in Figs. 1, 2, and 3.

It will be readily seen by reference to the dotted lines in Fig. 2 that the tops of the bows can be spread outwardly from a perpendicular sufficiently to take up the slack of the netting caused by dampness and other causes in long-continued use.

D designates an inverted bag, made of suitable netting of such dimensions as to fit neatly over the frame A and bows B when the latter are extended. The edge of the said bag or net is suitably attached to the frame A by stitching, binding, or in any other convenient, durable, and inexpensive manner.

The operation of this invention will be readily understood from the foregoing description, taken in connection with the drawings hereto annexed. After extending the bows so as to spread the netting over the frame, the ends of the bows are inserted into the ground around the plant, thereby stretching or spreading the net entirely over and around the same. Birds and insects are thus prevented from interfering with the plant, which is thus saved and protected until it has attained a strong and hardy growth.

Having thus described my invention, I claim and desire to secure by Letters Patent of the United States—

In a plant-protector, the combination of a rectangular frame, outwardly extensible bows or arches pivoted at or near the ends of the same, and a netting bag having its edge attached to the said frame, and adapted to cover the bows when extended, substantially as and for the purpose set forth.

In testimony that I claim the foregoing as my own I have hereunto affixed my signature in presence of two witnesses.

WILLIAM JOHNSTON.

Witnesses:
  GEO. W. BROWN,
  FRED H. KEENE.